United States Patent
Ji et al.

(10) Patent No.: US 11,258,555 B1
(45) Date of Patent: Feb. 22, 2022

(54) FLEXIBLE SCHEME FOR HIGH EFFICIENCY SIGB PROCESSING

(71) Applicant: Marvell International Ltd., Hamilton (BM)

(72) Inventors: Tong Ji, San Mateo, CA (US); Yen-Kai Chen, Zhubei (TW); Sai Man Simon Wong, Cupertino, CA (US); Mao Yu, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 153 days.

(21) Appl. No.: 16/663,929

(22) Filed: Oct. 25, 2019

Related U.S. Application Data

(60) Provisional application No. 62/750,703, filed on Oct. 25, 2018.

(51) Int. Cl.
*H04L 5/00* (2006.01)

(52) U.S. Cl.
CPC .......... *H04L 5/0023* (2013.01); *H04L 5/0037* (2013.01); *H04L 5/0048* (2013.01)

(58) Field of Classification Search
CPC .... H04L 5/0023; H04L 5/0037; H04L 5/0048
See application file for complete search history.

(56) References Cited

U.S. PATENT DOCUMENTS

| | | | |
|---|---|---|---|
| 2016/0285526 A1* | 9/2016 | Hedayat | H04B 7/0452 |
| 2016/0330718 A1* | 11/2016 | Kim | H04L 5/0091 |
| 2017/0064718 A1* | 3/2017 | Bharadwaj | H04W 28/08 |
| 2018/0184429 A1* | 6/2018 | Gan | H04W 28/00 |
| 2018/0367242 A1* | 12/2018 | Elsherif | H04B 7/0452 |

* cited by examiner

*Primary Examiner* — Muthuswamy G Manoharan

(57) ABSTRACT

Embodiments described herein provide systems for processing high efficiency SIGB (HE-SIGB) symbols and extracting resource unit (RU) information in down link orthogonal frequency division multiple access (DL-OFDMA) and multi-user multiple input multiple output (DL-MUMIMO) communication. An HE-SIGB symbol is processed based on an RU size mapping table. An RU counter is used to process entries in the RU size mapping table and determine the RU size and starting tone index of the intended RU. The RU parameters extracted from the HE-SIGB symbol are used to decode data symbols in the DL-OFDMA or DL-MUMIMO packet. Pilot tone indices of the intended User block and adjacent pilot tone indices are determined for improved carrier phase error estimation.

16 Claims, 6 Drawing Sheets

| Common Block | CRC/Tail | User Block [0] | CRC/Tail | User Block [1] | ... | User Block [N-1] | CRC/Tail |
|---|---|---|---|---|---|---|---|
| 201 | 202 | 203 | | 204 | | | |

310:
| RU signaling for 1st 20 MHz channel | RU signaling for 3rd 20 MHz channel | Center 26-RU (1 bit) |
|---|---|---|
| 311 | 312 | 313 |

320:
| RU signaling for 2nd 20 MHz channel | RU signaling for 4th 20 MHz channel | Center 26-RU (1 bit) |
|---|---|---|
| 321 | 322 | 323 |

FLEXIBLE SCHEME FOR HIGH EFFICIENCY SIGB PROCESSING

CROSS-REFERENCE TO RELATED APPLICATION

This application claims the benefit under 35 U.S.C. § 119(e) of U.S. Provisional Patent Application No. 62/750,703, filed Oct. 25, 2018, which is hereby incorporated by reference herein in its entirety.

FIELD OF USE

This disclosure relates to resource unit (RU) allocation in down link orthogonal frequency division multiple access (DL-OFDMA) and down link multi-user multiple input multiple output (DL-MUMIMO), and specifically, processing a high efficiency SIGB (HE-SIGB) symbol in DL-OFDMA and DL-MUMIMO communications to determine the RU allocation.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

The emerging IEEE 802.11ax Wi-Fi standard defines an HE-SIGB symbol in the preamble of an OFDMA packet. RU parameters such as the station ID assigned to the RU, number of wireless spatial streams used for communications, modulation and coding scheme (MCS), and forward error coding (FEC) type are obtainable by the receiver through HE-SIGB symbol processing.

For DL-OFDMA and DL-MUMIMO communications where a transmitter is communicating concurrently to one or more RUs, the receiver for each RU is receiving RU parameters for all RUs. Conventionally, a WLAN receiver stores all the parameters of each RU and identifies which of the RU parameters is its intended RU parameter through a multiplexing operation. Storing and multiplexing operations require both physical area on the receiver hardware and time to process these operations.

SUMMARY

Embodiments described herein provide a system for parsing HE-SIGB symbols for DL-OFDMA and DL-MUMIMO communications transmitted concurrently to one or more RUs. A receiver is configured to receive an HE-SIGB symbol including user blocks. Control circuitry, coupled to the receiver, is configured to determine, from an RU size-mapping table including a mapping of sequences of RU sizes, a size of a first RU and a size of a second RU. The RU sizes correspond to an amount of tones allocated to the respective RU. The control circuitry is configured to decode a first user block in the user blocks in the HE-SIGB symbol. The control circuitry is configured to increase, in response to determining that the decoded first user block is not dedicated to the receiver, a counter by the size of the first RU. The control circuitry is configured to decode a second user block of the user blocks in the HE-SIGB symbol. The control circuitry is configured to determine, in response to determining that the decoded second user block is dedicated to the receiver and based on a value of the counter and the size of the second RU, tones allocated to the receiver and store RU parameters encoded in the second user block.

In some implementations, the control circuitry is further configured to not store, in response to determining that the first user block is not dedicated to the receiver, a plurality of RU parameters encoded in the first user block. The control circuitry, in some embodiments, is configured to determine an RU signaling sequence and map the RU signaling sequence to a sequence of RU sizes in the RU size-mapping table. The circuitry determines, from the RU size-mapping table, a plurality of pilot tone indices for the first RU based on a channel bandwidth of the first RU, in some implementations. The control circuitry is configured to determine, from the RU size-mapping table and in response to determining that the decoded first user block is not dedicated to the receiver, a plurality of pilot tone indices for the second RU based on a channel bandwidth of the second RU. In some implementations, the control circuitry is configured to calculate, based on the plurality of pilot tone indices for the second RU and in response to determining that the decoded second user block is dedicated to the receiver, a carrier phase error estimate.

In some implementations, the receiver is configured to receive high efficiency data (HE-DATA) symbols after receiving the HE-SIGB symbol and the control circuitry is configured to decode, based on stored RU parameters, HE-DATA symbols. The control circuitry is configured to determine that the second user block is dedicated to the receiver by matching a station ID of the receiver to a station ID encoded in the HE-SIGB symbol. The plurality of RU parameters encoded in the second user block is at least one of the station ID of the receiver, a number of streams available for transmission to the receiver, a modulation coding scheme, or forward error correction type. The counter, in some embodiments, is an RU tone index counter. In these embodiments, the control circuitry is configured to increment, in response to determining that the decoded first user block is not dedicated to the receiver, an RU index counter and store, in response to determining that the decoded second user block is dedicated to the receiver, the value of the RU index counter as an intended user index.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which:

FIG. 2 is a diagram of an illustrative HE-SIGB symbol transmitted by the wireless communications system of FIG. 1 in accordance with at least some embodiments of the present disclosure;

FIG. 3 is a diagram of an illustrative common block of the HE-SIGB symbol of FIG. 2 in accordance with at least some embodiments of the present disclosure;

DETAILED DESCRIPTION

Figure 1:
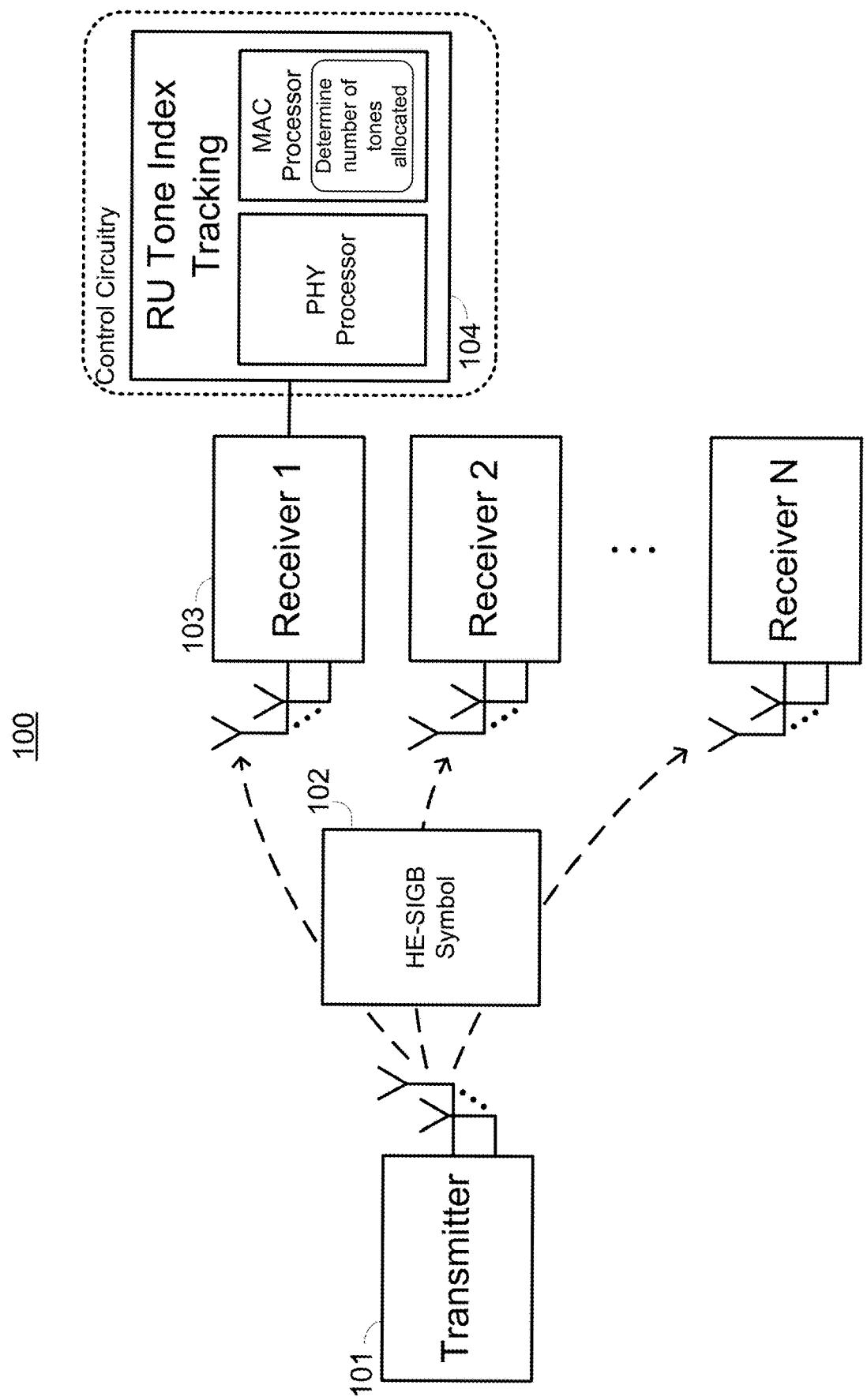
FIG. 1 is a block diagram of an illustrative wireless communications system for transmitting HE-SIGB symbols in accordance with at least some embodiments of the present disclosure.

This disclosure describes methods and systems for HE-SIGB processing for DL-OFDMA and DL-MUMIMO. Specifically, methods for extracting RU information (e.g., a starting tone index and number of tones allocated to an RU) from HE-SIGB symbols are described herein.

A receiver decodes the payload data symbols of a DL-OFDMA or DL-MUMIMO packet based on extracted information from an HE-SIGB symbol of a DL-OFDMA packet or DL-MUMIMO packet. In some embodiments, a Viterbi decoder decodes and outputs an entire HE-SIGB symbol. According to signal bandwidth and a total number of users, obtained from decoding the high efficiency SIGA (HE-SIGA) symbol received prior to receiving the HE-SIGB symbol within the DL-OFDMA or DL-MUMIMO packet, the receiver parses the decoded HE-SIGB symbol into different fields (e.g., HE-SIGB Common and User blocks). The receiver determines RU sizes and a number of RUs for each channel bandwidth (e.g., 20 MHz channel). The receiver subsequently determines the total number of RUs for the DL-OFDMA or DL-MUMIMO packet. Hence, the number of User blocks of the HE-SIGB symbol is determined. The receiver parses all User blocks for RU parameters (e.g., station ID, number of streams, MCS, and FEC type).

By comparing the station ID (STA ID) of the RU parameters with a local register value of the receiver, the receiver determines which User block is intended for its use and which channel (e.g., 20 MHz channel) that the User block is located. In parallel to determining which User block is intended for its use, the receiver also tracks start tone indices for each RU. When the intended User block is determined, the receiver then multiplexes the related parameters for the intended user to output for decoding. By matching the STA ID from RU parameters with the local register value of the receiver, the receiver does not need to know if the RU crosses multiple 20 MHz bands or not. A receiver uses a starting tone index and the RU size intended for it to determine the bandwidth of frequency tones allocated for its use, regardless of whether the RU crosses multiple 20 MHz bandwidths defined by the standard (i.e., each 20 MHz channel has its own starting tone index that is predefined by the IEEE 802.11ax standard). Based on the RU size and the intended RU location within its channel, the receiver calculates the starting tone index for the RU. The receiver performs carrier phase error (CPE) estimation using the pilot tones allocated to it. Pilot tone allocation is predefined by the IEEE 802.11ax standard. In some implementations, a receiver uses additional pilot tones to improve CPE estimation by using adjacent RUs' pilot tones. To determine the adjacent RUs' pilot tones, the receiver determines the starting tone index of each RU based on the starting tone indices of each 20 MHz channel and the RU size within that 20 MHz channel. Based on the signal bandwidth, the receiver selects a corresponding number of pilot tone indices and stores them for use in CPE estimation.

The system and methods described herein provide improvements in hardware area and timing. The HE-SIGB processing system, by tracking the RU starting indices in parallel with comparing STA IDs, is not required to store all the RU parameters of each RU in order to extract its intended RU parameters. The HE-SIGB processing system also does not require multiplexing the intended RU's parameters based on the intended User block index. Accordingly, the system provides an advantage in hardware area and timing since it does not need large multiplexers, especially for OFDMA. In some embodiments, the system does not need a memory size required store all RU parameters. Additionally, the systems and methods herein provide flexibility when applied to large RU sizes (e.g., an RU size greater than 20 MHz or 242 tones). For example, a starting tone index for a 484-tone RU is difficult to determine when either of two 20 MHz Common fields maps to a 484-tone empty RU. The HE-SIGB processing system, by relying on RU sizes for each 20 MHz and an RU counter that increments through the total number of RUs specified by the HE-SIGA symbols, provides clarity when determining the starting tone index for a 484-tone RU without relying on mapping that happens to coincide for multiple RUs.

The HE-SIGB processing system also reduces the computational complexity and storage needed to determine adjacent pilot tones for improved CPE estimation. The system does not require determining all pilot tone indices at one time to determine which RU's pilot tones will be used for CPE estimation. Since the pilot tone indices are, in some implementations, determined simultaneously with the starting tone index for each RU while the RU counter is increasing, the system only needs to determine which RU is the intended RU (i.e., RU's STA ID matches the locally stored ID) and whether to push the dynamically determined pilot tones (e.g., based on how many pilot tones are needed and whether the shift register is full).

FIG. 1 is a block diagram of illustrative wireless communications system 100 for transmitting HE-SIGB symbols in accordance with at least some embodiments of the present disclosure. Transmitter 101 is, in some implementations, an access point of an IEEE 802.11ax Wi-Fi system that supports DL-OFDMA or DL-MUMIMO communications. Transmitter 101 transmits HE-SIGB symbol 102 to receiver 103 and the other N−1 receivers of system 100 having N users. A receiver (e.g., receiver 103) in system 100 is coupled to or includes control circuitry that performs preamble processing, including RU Tone Index Tracking 104. RU Tone Index Tracking 104 is performed by PHY and MAC processors. PHY and MAC processors process the HE-SIGA and HE-SIGB symbols of DL-OFDMA or DL-MUMIMO packets to simultaneously track RU start tone indices and compare STA IDs in the User Blocks of the HE-SIGB symbols with locally stored register values. The MAC processor of RU Tone Index Tracking 104 determines a number of tones allocated to receiver 103 (e.g., determine the size of the RU based on a predefined mapping table in the IEEE 802.11ax standard).

FIG. 2 is a diagram of illustrative HE-SIGB symbol 200 transmitted by the wireless communications system of FIG. 1 in accordance with at least some embodiments of the present disclosure. HE-SIGB symbol 200 is transmitted with the DL-OFDMA or DL-MUMIMO packet by an access point (AP) transmitter (e.g., transmitter 101). HE-SIGB 102 has a similar structure to HE-SIGB symbol 200, including common block 201, CRC/Tail blocks (e.g., CRC/Tail 202), and User Blocks (e.g., User Block 203 and 204). As referred to herein, a "block" of a symbol can be referred to as a "field" (e.g., a Common Block and a Common Field both refer to 201). Common Block 201 includes N 8-bit mapping table indices, wherein N is equivalent to the number of channels covered by the SIGB content channel over which the HE-SIGB symbol is transmitted, and 1 bit for center 26-RU allocation per 80 MHz (i.e., for 80 or 160 MHz channel bandwidths in DL-OFDMA communications). The common block of an HE-SIGB field for an 80 MHz physical layer conformance procedure (PLCP) Protocol Data Unit (PPDU) is described in the description of FIG. 3. A mapping table is defined in the IEEE 802.11ax standard and partially shown in Table 1 herein. The mapping table defined by the standard contains 38 entries in total for RU allocation in each 20 MHz channel.

FIG. 3 is a diagram of illustrative common blocks of the HE-SIGB symbol of FIG. 2 in accordance with at least some embodiments of the present disclosure. Each content channel occupies a 20 MHz channel. A 20 MHz bandwidth receiver receives only the Common field for the content channel that the receiver is tuned to. Common field 310 includes RU signaling 311 for the first 20 MHz channel, RU signaling 312 for the third 20 MHz channel, and center 26-RU 313 for the users of content channel 1. Common field 320 includes RU signaling 321 for the second 20 MHz channel, RU signaling 322 for the fourth 20 MHz channel, and center 26-RU 323 for the users of content channel 2. Although only four 20 MHz channels are depicted, more 20 MHz channels may be used. For example, eight 20 MHz channels are used (i.e., 8 RU signaling fields across common fields 310 and 320). Although 20 MHz channels are depicted, other channel bandwidths are supported by DL-OFDMA (e.g., 40 MHz, 80 MHz, 160 MHz, and 80+80 MHz bandwidths).

RU signaling 311, 312, 321, and 322 each include an 8-bit mapping value used to determine the RU sizes for each RU in the 20 MHz bandwidth. The IEEE 802.11ax defines an RU size mapping table, as illustrated in part in Table 1, that maps the 8-bit value from the common field of the HE-SIGB symbol to a sequence of up to 9 RU sizes. For example, if RU signaling 311 has an 8-bit mapping value 00000000, the 8-bit value maps to an RU size of 26 for each of the 9 RUs in the first 20 MHz channel. If RU signaling 312 has an 8-bit mapping value 00000010, the 8-bit value maps to an RU size of 52 for the 6th RU and an RU size of 26 for the other RUs (i.e., RU 1-5, 8, and 9).

TABLE 1

Partial RU Size Mapping from IEEE 802.11ax

| 8-bit indices | #1 | #2 | #3 | #4 | #5 | #6 | #7 | #8 | #9 | No. of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |

TABLE 1-continued

Partial RU Size Mapping from IEEE 802.11ax

| 8-bit indices | #1 | #2 | #3 | #4 | #5 | #6 | #7 | #8 | #9 | No. of entries |
|---|---|---|---|---|---|---|---|---|---|---|
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |

The RU sizes in standard-defined Table 1, in some embodiments, are used to determine which tones are allocated to the intended RU. For example, if the intended RU has an 8-bit mapping sequence of 00000000 and is the third of the nine RUs, the control circuitry of the RU designates the $53^{rd}$ tone index as the starting tone and decodes it and the subsequent 25 tones (i.e., 26 tones allocated in total), to extract the payload in the Data symbols received in the DL-OFDMA or DL-MUMIMO packet after receiving the HE-SIGB symbol. If the intended RU has an 8-bit mapping sequence of 00001100 and is the second of seven RUs, the control circuitry of the RU designates the $53^{rd}$ tone index as the starting tone and decodes it and the subsequent 51 tones (i.e., 52 tones allocated in total), to extract the payload.

Figure 5:
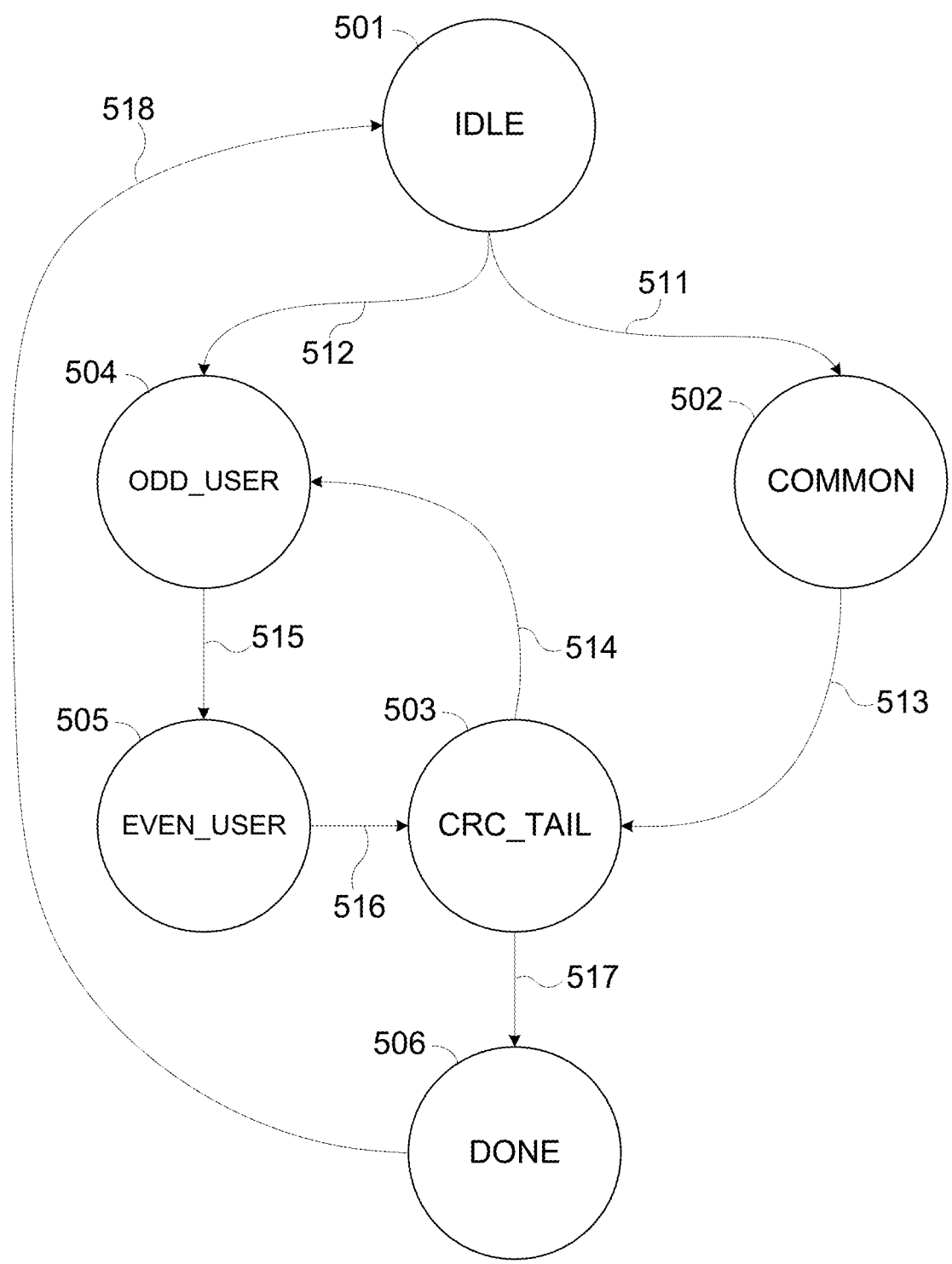
FIG. 5 is a state diagram of an illustrative state machine for processing the HE-SIGB symbol transmitted by the wireless communications system of FIG. 1 in accordance with at least some embodiments of the present disclosure.

In some embodiments, a control circuitry maintains programming variables when tracking the RU start tone indices (e.g., following a state machine such as that in FIG. 5). For example, an RU counter, values such as the starting tone (e.g., variable "ru_start_tone_index"), the size of the RU (e.g., variable "per_ru_size_sel"), and a counter index (e.g., variable "ru_index_cnt") are maintained as a row of the size-mapping table is parsed. The RU counter begins at 1 and counts to the maximum number of RUs (e.g., 37 maximum RUs). The IEEE 802.11ax standard defines the maximum number of RUs for each channel width such that for an RU type of 26-tone RU, the maximum number of RUs is 9 for a channel bandwidth of 20 MHz, 18 for a channel bandwidth of 40 MHz, 27 for a channel bandwidth of 80 MHz and 74 for a channel bandwidth of 80+80 MHz or 160 MHz. The ru_index_cnt begins at 1 and counts to the total number of RUs in the packet. The total number of RUs in the packet depends on the implementation details such as the channel bandwidth. For example, for 80+80 MHz or 160 MHz packets, the total number of RUs as defined by the IEEE 802.11ax standard is 74 RUs. In some implementations, two separate counters with respective maximums of 37 users is used for the 74 RUs. A single counter, in some implementations, is used to handle the entire 160 MHz channel bandwidth with a maximum of 74 RUs. The RU counter and ru_index_cnt are synchronized such that both are incremented after an RU is accounted for while parsing the size-mapping table. The ru_start_tone_index begins at an initial value (e.g., 0 or 1) or an initial value corresponding to the first frequency available in the 20 MHz channel (e.g., 2.401 GHz). The per_ru_size_sel is loaded with a value corresponding to the RU size (i.e., the number of frequency tones allocated to the RU). For example, when processing the first RU signaling block (e.g., RU signaling 311) having an 8-bit mapping sequence of 00000000, the RU counter begins at value 1, the ru_index_cnt begins at value 1, the per_ru_size_sel is loaded with 26, and the ru_start_tone_index is loaded with an initial tone index for the first RU. For the second RU mapped with the 8-bit value of 00000000, the RU counter and ru_index_cnt increments to 2, the per_ru_size_sel is loaded with 26, and the ru_start_tone_index value is incremented by 26. The value ru_index_cnt and the value of the RU counter, in some implementations, differ as the RU counter accounts for a center 26-RU (e.g., center 26-RU 313 and 323). For example, the RU counter for the first 20 MHz channel is 1, the RU counter for the second 20 MHz channel is 10 after counting the nine RUs mapped by the 8-bit mapping value in RU signaling 311 for the first 20 MHz channel, the RU counter for the third 20 MHz channel is 20 after counting the nine RUs mapped by the 8-bit mapping value in RU signaling 312 for the second 20 MHz channel and center 26-RU 313. As the RU counter has been incremented in this example, ru_index_cnt value starts at 19 for the third 20 MHz channel, not accounting for the 1-bit center 26-RU.

Figure 4:
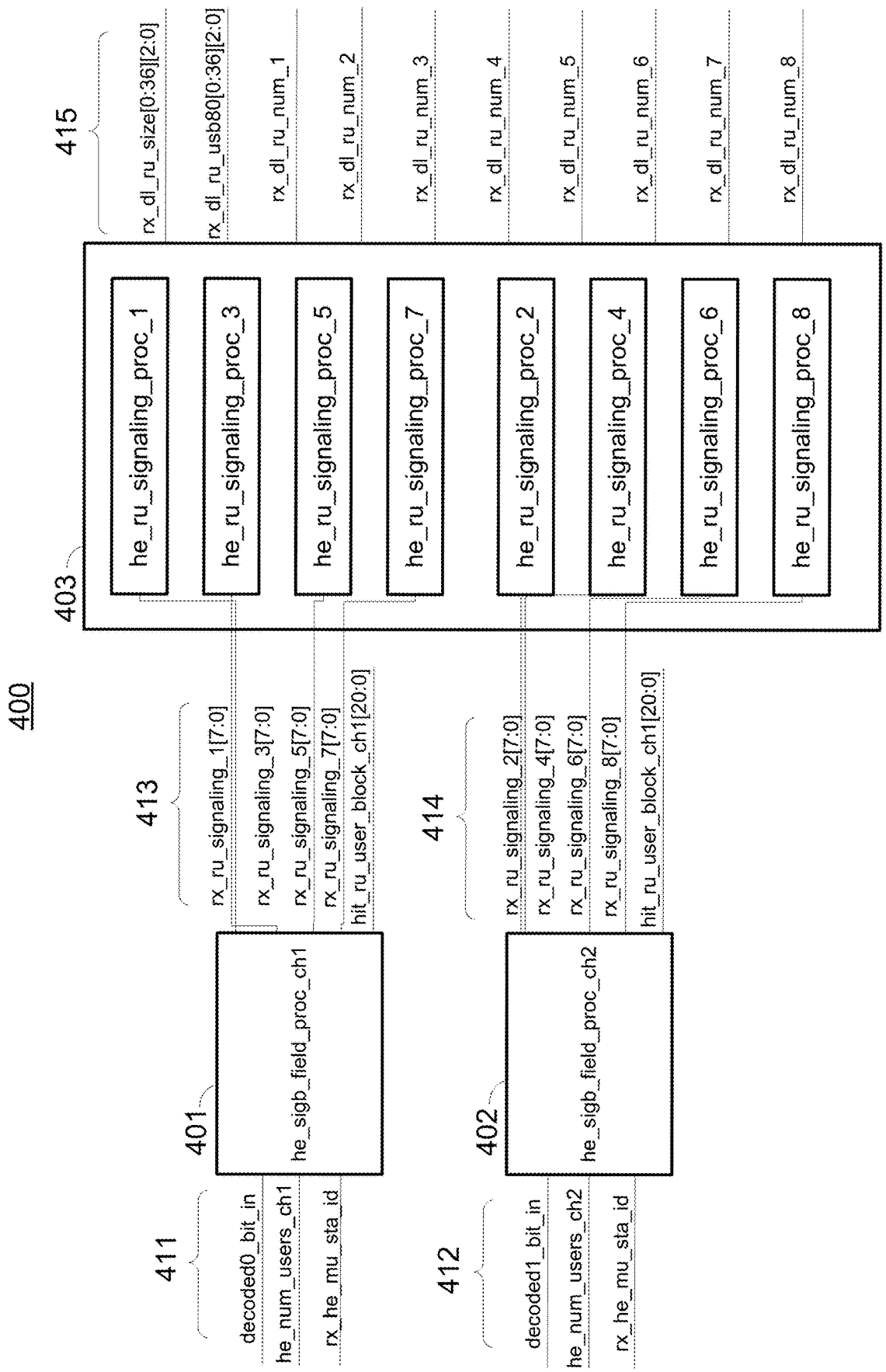
FIG. 4 is a diagram of an illustrative top-level architecture for an HE-SIGB processor for processing the HE-SIGB symbol transmitted by the wireless communications system of FIG. 1 in accordance with at least some embodiments of the present disclosure.

FIG. 4 is a diagram of an illustrative top-level architecture 400 for an HE-SIGB processor for processing the HE-SIGB symbol transmitted by the wireless communications system of FIG. 1 in accordance with at least some embodiments of the present disclosure. HE-SIGB field processors 401 and 402 use HE-SIGA data 411 and 412 when processing HE-SIGB data. For example, the signal bandwidth and total number of RUs are obtained from decoding the HE-SIGA symbol. HE RU signaling processor 403 processes RU signaling data 413 and 414 that is output from HE-SIGB field processors 401 and 402. DL RU data 415, including the starting tone index and RU size of the intended RU, is used to decode the data symbol payload of the DL-OFDMA or DL-MUMIMO packet.

HE-SIGA 411 and 412 include the number of users in each of channels 1 and 2, respectively, in addition to the STA ID assigned to the receiver. HE-SIGB field processor 401 processes the HE-SIGB field for channel 1 to obtain the RU signaling fields for each user in channel 1 (e.g., users 1, 3, 5, and 7). Processor 401 also obtains a value indicative of which User block has a STA ID matching the intended receiver's assigned STA ID. HE-SIGB field processor 402 processes the HE-SIGB field for channel 2 to obtain the RU signaling fields for each user in channel 2 (e.g., users 2, 4, 6, and 8). HE RU signaling processor 403, in some embodiments, comprises processors for the RU signaling for each user. RU signaling processing performed by processor 403 is, in some embodiments, similar to that described in the description of FIG. 3. DL RU data 415 output from HE RU signaling processor 403 includes the extracted RU sizes and the upper sub-band. In some embodiments, the rx_dl_ru_num, indicative of the RU size for each RU, is an optional output.

FIG. 5 is a diagram of illustrative state machine 500 for processing the HE-SIGB symbol transmitted by the wireless communications system of FIG. 1 in accordance with at least some embodiments of the present disclosure. State machine 500 includes 6 states: Idle state 501, Common state 502, CRC Tail state 503, Odd User state 504, Even User state 505, and Done state 506. States 501-506 are used, in some implementations, to process an HE-SIGB symbol (e.g., HE-SIGB symbol 200). In some implementations, the processes in state machine 500 are performed by control circuitry at or coupled to the receiver. State machine 500 controls, in some embodiments, the quantity of bits that are decoded for each field of the decoded HE-SIGB is based on the information parsed from the HE-SIGA symbol.

State machine 500 begins at Idle state 501. At Idle state 501, the control circuitry has not received an HE-SIGB symbol for processing. For example, the control circuitry receives the HE-SIGA symbol while at Idle state 501. The HE-SIGA symbol includes information to help process the HE-SIGB symbol once it is received. During Idle state 501, the receiver processes other symbols, in some embodiments. Idle state 501, in some implementations, occurs before the Viterbi decoder has processed HE-SIGB for parsing.

After the control circuitry has received the HE-SIGB symbol, the control circuitry checks for a Common field. In some implementations, the HE-SIGA symbol contains an indication for whether the HE-SIGB symbol contains a Common field. For example, a "compress mode" flag is set to 0 to indicate, at transition 511, that the HE-SIGB symbol contains a Common field (e.g., "~compress mode" must be satisfied at transition 511). If the HE-SIGA field indicates a Common field in the HE-SIGB symbol, state machine 500 proceeds to Common state 502. If the HE-SIGA field does not indicate a Common field in the HE-SIGB symbol, state machine 500 proceeds directly to Odd User state 504 to begin processing User blocks (e.g., User block 203). A criterion of transition 512 such as "compress mode & he_num_user !=0" is evaluated to determine whether state machine 500 proceeds to Odd User state 504, where variable "he_num_user" represents the number of users in the DL-OFDMA or DL-MUMIMO communications system.

At Common state 502, the control circuitry processes RU signaling fields within the Common field (e.g., RU signaling fields 311, 312, 321, and 322). Center 26-RU is processed similar to other RUs for the HE-SIGB symbol. In some embodiments, the control circuitry causes the HE-SIGB Common field to be stored for each content channel (e.g., channels 1 and 2). By processing the Common field, the control circuitry determines the starting tone index and RU size of the intended receiver. In some implementations, a mapping table for each RU signaling field in the HE-SIGB symbol is instantiated. For example, the control circuitry instantiates 8 mapping tables (e.g., the predefined IEEE 802.11ax mapping table as partially shown in Table 1) for an HE-SIGB symbol having 8 RU signaling fields. Each mapping table has 9 RU size outputs for each RU and an output for the total number of RUs in a channel bandwidth (e.g., 20 MHz).

The RU size outputs for each RU are stored into an array of RU sizes. The size of the array is based upon the maximum number of RUs supported (e.g., 37 entries in the array corresponding to a maximum of 37 RUs). Each entry in the RU size array has 3 bits representing a respective RU size. The array is, in some implementations, based on the device bandwidth and the number of RUs from each mapping table. The control circuitry initiates an RU counter whose values span the number of RUs (e.g., from 1 to 37). The RU counter is used to read the RU size from the array of RU sizes and set a variable to the RU size value (e.g., load the RU size to a variable "per_ru_size_sel").

Based on the device bandwidth and the first RU size in the array of RU sizes, the control circuitry determines an RU start tone index of the first RU (e.g., populates variable "ru_start_tone_index"). The start tone index varies according to device and packet bandwidth as the number of guard tones and FFT sizes vary. The RU start tone index and a counter for the RU index change together (e.g., the values of both increase as the mapping table is processed). The control circuitry, in some embodiments, tracks each RU's start tone index and determines whether the RU is the intended RU (e.g., by matching STA IDs in the User block to locally stored receiver identification information) in parallel. State machine 500 proceeds to CRC Tail state 503 when the criterion of transition 513 is satisfied. For example, transition 513 has criteria that the number of bits decoded during Common state 502 is 8 for channel bandwidths of 20 MHz or 40 MHz, 18 bits for channel bandwidth of 80 MHz, and 34 bits for other channel bandwidths (e.g., 160 MHz).

At CRC_Tail state 503, the control circuitry verifies that the Common field of the HE-SIGB has been fully stored. State machine 500 does not proceed, in some embodiments, to Odd User state 504 until the Common field is fully stored.

At Odd User state 504, the control circuitry processes a User block (e.g., odd-indexed User blocks) of the User blocks in the HE-SIGB symbol. The control circuitry determines if the STA ID information in the User block matches the STA ID of the receiver (e.g., the receiver's registered ID). If the IDs match, the control circuitry causes the RU parameters encoded in the User block to be stored into corresponding registered to be used for HE-DATA decoding. If the IDs do not match, the control circuitry does not store the RU parameters encoded in the User block. State machine 500 proceeds to Even User state 505 when the criteria of transition 515 is satisfied. For example, transition 515 requires that the number of decoded bits of the User block field is 22 bits and that the number of User blocks processed is not equivalent to the total number of users. Although not depicted, if the number of User blocks processed is equivalent to the total number of users, state machine 500 proceeds directly to Done state 506, in some embodiments.

At Even User state 505, the control circuitry processes a User block (e.g., even-indexed User blocks) of the User blocks in the HE-SIGB symbol. The control circuitry determines if the STA ID information in the User block matches the STA ID of the receiver (e.g., the receiver's registered ID). If the IDs match, the control circuitry causes the RU parameters encoded in the User block to be stored into corresponding registered to be used for HE-DATA decoding. If the IDs do not match, the control circuitry does not store the RU parameters encoded in the User block. State machine 500 proceeds to CRC_Tail state 503 when the criteria of transition 516 is satisfied. For example, transition 516 requires that the number of decoded bits of the User block field is 20 bits. At CRC_Tail state 503, the control circuitry determines whether all of the User blocks in the HE-SIGB symbol have been processed. If they have not, state machine 500 returns to Odd User state 504. If all the User blocks have been processed (e.g., satisfying a criterion of transition 517), state machine 500 proceeds to Done state 506.

At Done state 506, the system has processed the HE-SIGB symbol to determine the RU parameters intended for the receiver among the RU parameters intended for other receivers. At this state, the system has tracked the RU start tone indices in parallel with comparing STA ID's to determine which RU parameters to store. That is, after the number of User blocks of HE-SIGB is determined and parsed for RU parameters, the system only stores the parsed RU parameters intended for it. By comparing the STA ID with a local register value, the system determines which User block is intended and which 20 MHz channel this User block is located. State machine 500 returns, in some implementations, to Idle state 501 through transition 518 to await another HE-SIGB symbol.

Figure 6:
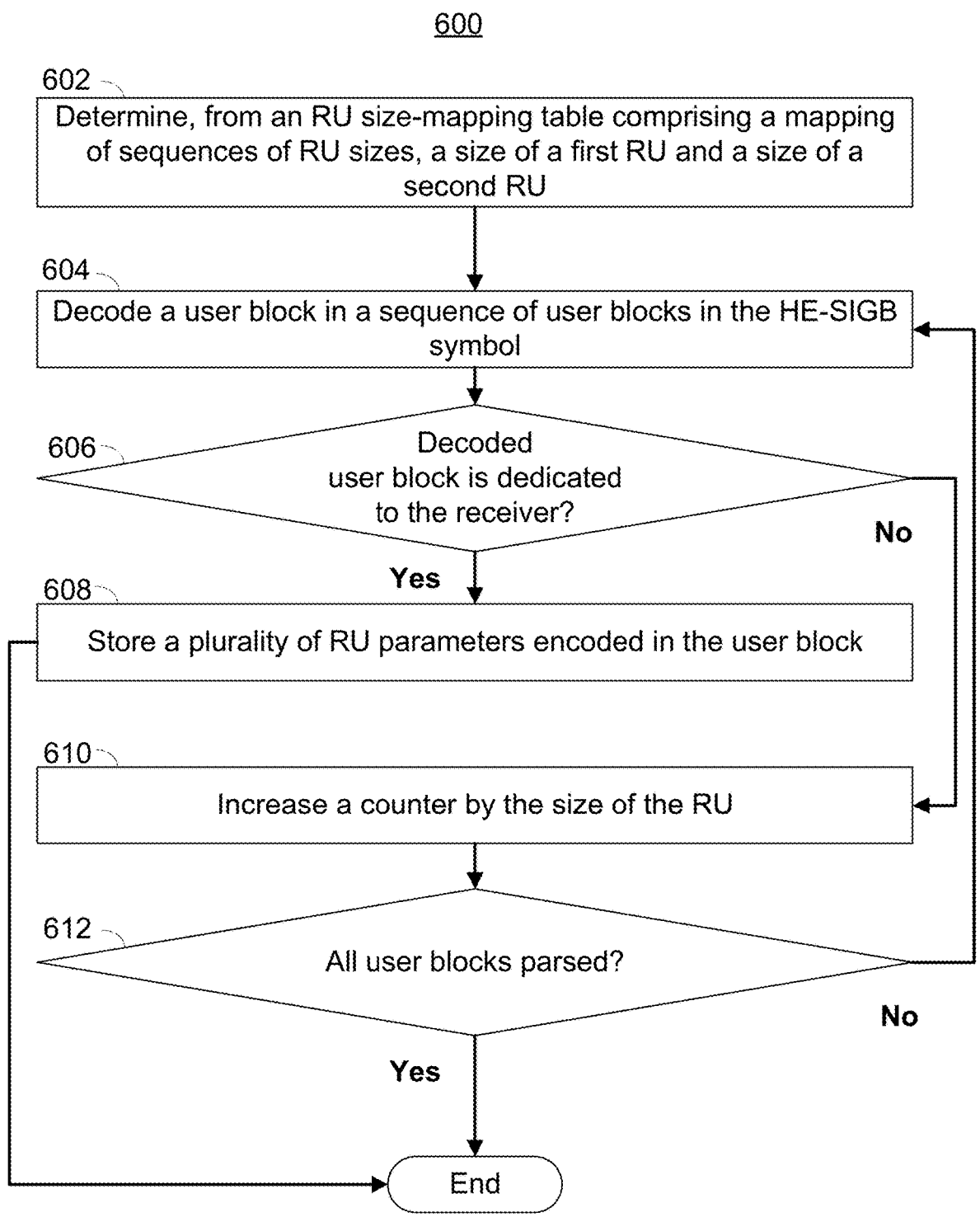
FIG. 6 is a flow diagram illustrating a process for determining RU parameters for an intended RU from an HE-SIGB symbol transmitted by the wireless communications system of FIG. 1 in accordance with at least some embodiments of the present disclosure.

FIG. 6 provides an example logic flow diagram illustrating aspects of HE-SIGB symbol processing, according to at least some embodiments described herein. Control circuitry coupled to a receiver (e.g., receiver 103), in some embodiments, performs process 600.

At 602, the control circuitry determines, from an RU size-mapping table (e.g., IEEE 802.11ax pre-defined RU sizes as partially shown in Table 1) comprising a mapping of sequences of RU sizes, a size of a first RU and a size of a second RU. For example, an RU size of 26 for a first RU and an RU size of 26 for a second RU is determined based on an 8-bit mapping sequence of 00000000 applied to the pre-defined RU sizes of IEEE 802.11ax.

At 604, the control circuitry decodes a User block in a sequence of User blocks in the HE-SIGB symbol. For example, the control circuitry decodes User block 203 of HE-SIGB symbol 200. The control circuitry, in some embodiments, implements Viterbi decoding to decode the HE-SIGB symbol. The control circuitry takes, in some implementations, the output of the Viterbi decoder directly with two decoded bits per clock cycle. Information decoded from the HE-SIGA symbol is used by the control circuitry to determine how many bits there are for each HE-SIGB Common field (e.g., Common Block 201) and each User block (e.g., User blocks 203 and 204).

At 606, the control circuitry determines whether the decoded User block is dedicated to the receiver (e.g., receiver 103). The control circuitry simultaneously compares STA IDs to make the determining of 606 and tracks the start tone indices of the RUs to only store the RU parameters intended for the receiver. If the decoded User block is dedicated to the receiver, process 600 proceeds to 608. For example, if the control circuitry determines that decoded User block 203 does contain the intended STA ID of receiver 103, process 600 proceeds to 608. If the decoded User block is not dedicated to the receiver, process 600 proceeds to 610.

At 608, the control circuitry stores a plurality of RU parameters encoded in the User block. For example, if the control circuitry, at 606, determines that the decoded User block does contain the intended STA ID of receiver 103, process 600, at 608, stores the RU parameters encoded in User block 203 to be used to decode the data payload received after the HE-SIGB symbol in the DL-OFDMA or DL-MUMIMO packet. RU parameters stored include station ID, number of streams allocated to the RU, the MCS is used by the receiver to decode packets, the FEC type, RU size, the starting tone index used, and the number of user streams for use in DL-MUMIMO.

At 610, the control circuitry increases a counter by the size of the RU. For example, if the control circuitry, at 606, determines that decoded User block 203 does not contain the intended STA ID of receiver 103, process 600, at 610, increases a counter by the size of the RU. A starting tone counter is, in some embodiments, incremented by the size of the RU of User block 203 (e.g., incrementing the starting tone counter by 26).

At 612, the control circuitry determines whether all User blocks are parsed. If the control circuitry determines that all User blocks are parsed, process 600 terminates. In some implementations, the control circuitry, to determine whether all User blocks are parsed, determines that the symbol currently being parsed is a data symbol or any suitable symbol transmitted after the HE-SIGB symbol. If the control circuitry determines that not all User blocks are parsed, process 600 returns to 604 to parse another User block in the HE-SIGB symbol.

Figure 7:
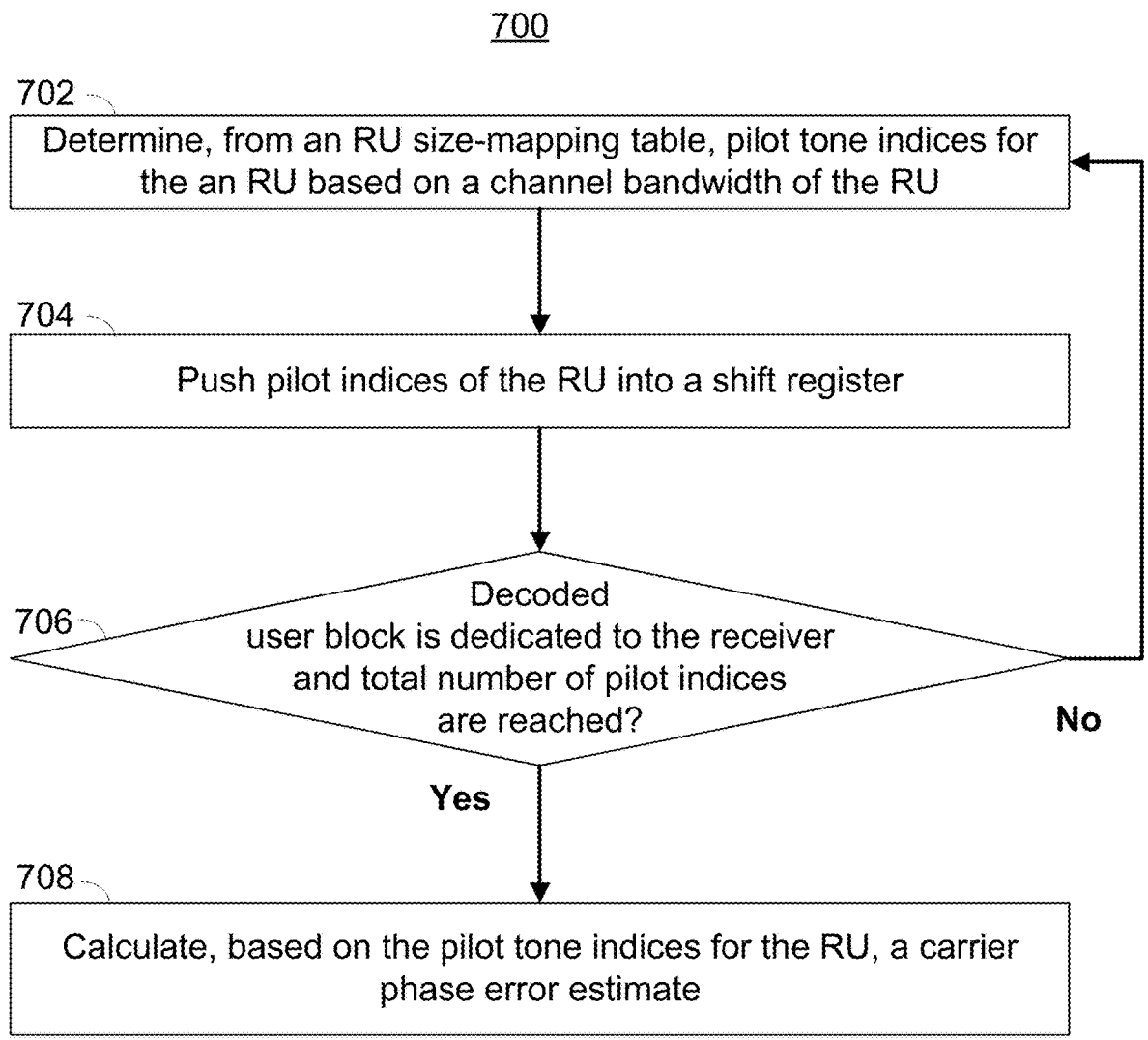
FIG. 7 is a flow diagram illustrating a process for determining pilot tone indices during HE-SIGB symbol processing of FIG. 6 to compensate for carrier phase error, according to at least some embodiments described herein.

FIG. 7 provides an example logic flow diagram illustrating aspects of HE-SIGB symbol processing to determine pilot tone indices, according to at least some embodiments described herein. Control circuitry coupled to a receiver (e.g., receiver 103), in some embodiments, performs process 700. In some implementations, process 600 further includes portions of process 700 to determine pilot tones while processing the HE-SIGB symbol. For a small RU, the number of pilot tones is limited (e.g., 2 pilot tones for an RU of size 26 and 4 pilot tones for an RU of size 52). The minimum number of pilot tones for a single user (SU) IEEE 802.11ax packet is 8 for a 20 MHz channel. Process 700 determines, in some implementations, pilot tones from adjacent RUs for small RU CPE estimation. To initialize for process 700, the control circuitry, in some implementations, creates a 16-stage shift register for storing the pilot tone indices. For example, the maximum number of pilot tones is 16 for the HE packet, which is an IEEE 802.11ax packet that is an DL-OFDMA packet for a small set of RUs. Maintaining the starting tone index and the size of the RU for each RU achieves a benefit of providing process 700 of determining pilot tone indices.

At 702, the control circuitry determines, from an RU size-mapping table, pilot tone indices for the first RU and pilot tone indices for the second RU. Pilot tone indices are pre-defined by IEEE 802.11ax such that they can be determined based on the start tone index and size of the RU. The number of pilot tones and locations is defined based on the size of the RU. Specifically, the IEEE 802.11ax standard defines that a size 26 RU corresponds to 2 pilot tones, a size 52 RU corresponds to 4 pilot tones, a size 106 RU corresponds to 4 pilot tones, and a size 242 RU corresponds to 8 pilot tones. The IEEE 802.11ax standard defines the locations of the pilot tones by both the channel bandwidth and the RU size.

At 704, the control circuitry pushes pilot indices of the RU into the shift register. As the control circuitry updates the value of RU signaling processing variables such as an RU counter and an RU size variable per RU, the pilot indices of the respective RU is pushed into the shift register. The signal bandwidth is used to determine how many pilots are needed in total. For example, a 20 MHz channel bandwidth includes 8 pilot tones and a 40 or 80 MHz bandwidth includes 16 pilot tones.

At 706, the control circuitry determines whether the decoded User block is dedicated to the receiver and whether the total number of pilot indices have been reached. If the control circuitry determines that the total number of pilot tones and the respective indices have been stored for a first channel bandwidth (e.g., the first 20 MHz channel) but the User block's STA ID does not match receiver's STA ID, the control circuitry continues to the next User block (e.g., process 700 returns to 702). The User blocks are parsed until the STA ID of the User block matches the STA ID of the receiver. If the control circuitry determines that the User block's STA ID does match the receiver's STA ID but the total number of pilot tones and the respective indices have not been stored for the bandwidth of the RU, the control circuitry continues to the next User block until the total number of pilot indices have been accounted for. In some embodiments, 706 is similar to 606 in that the determination of whether the User block is dedicated to the receiver is based on matching a STA ID of the User block to the STA ID of the receiver. 702, 704, and 708 are, in some embodiments, performed by the control circuitry in parallel with or within process 600.

At 708, the control circuitry calculates, based on the pilot tone indices for the RU determined in 702, a carrier phase error estimate. The control circuitry may read out all the pilot indices for the CPE to use. For example, the control circuitry calculates the phase shift of the received signals on the pilot tones allocated for the RU.

Various embodiments discussed in conjunction with FIGS. 1-7 are performed by various electronic components of one or more electronic circuits, such as but not limited to an integrated circuit, application-specific integrated circuit (ASIC), DSP, and/or the like. While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 6 does not necessarily require the particular order shown, or sequential order, to achieve desirable results. For example, the decoding of 604 in process 600 is, in some implementations, done prior to step 602 to parse decoded information from the HE-SIGB symbol based on the size-mapping table (e.g., a Viterbi decoder decodes the entire HE-SIGB symbol before the RU signaling fields are processed). In certain implementations, multitasking and parallel processing may be advantageous. Other variations are within the scope of the following claims.

What is claimed is:

1. A method for decoding high efficiency SIGB (HE-SIGB) symbols for downlink orthogonal frequency division multiple access (DL-OFDMA) and downlink multi-user multiple input multiple output (DL-MUMIMO) communications transmitted concurrently to one or more resource units (RU), the method comprising:
receiving, at a station, an HE-SIGB symbol comprising a plurality of user blocks;
determining, from an RU size-mapping table comprising a mapping of sequences of RU sizes, a size of a first RU and sizes of respective subsequent RUs, wherein the RU sizes correspond to an amount of tones allocated to the respective RU;
initializing a counter;
decoding a first user block of the plurality of user blocks in the HE-SIGB symbol;
in response to determining that the decoded first user block is not dedicated to the station, increasing the counter by the size of the first RU;
continuing to decode subsequent user blocks of the plurality of user blocks in the HE-SIGB symbol and, for each respective subsequent user block determined not to be dedicated to the station, increasing the counter by the size of the respective subsequent RU, until determining that a particular subsequent user block is dedicated to the station; and
in response to determining that the particular subsequent user block is dedicated to the station:
determining, based on a value of the counter and the size of the particular subsequent RU, a plurality of tones allocated to the station; and
storing the counter value and a plurality of RU parameters encoded in the particular subsequent user block.

2. The method for decoding HE-SIGB symbols of claim 1, further comprising, in response to determining that the first user block is not dedicated to the station, not storing a plurality of RU parameters encoded in the first user block.

3. The method for decoding HE-SIGB symbols of claim 1, further comprising:
determining an RU signaling sequence; and
mapping the RU signaling sequence to a sequence of RU sizes in the RU size-mapping table.

4. The method for decoding HE-SIGB symbols of claim 1, further comprising:
   determining, from the RU size-mapping table, a plurality of pilot tone indices for the first RU based on a channel bandwidth of the first RU;
   in response to determining that the decoded first user block is not dedicated to the station, determining, from the RU size-mapping table, a plurality of pilot tone indices for each respective subsequent RU based on a channel bandwidth of the respective subsequent RU; and
   in response to determining that a decoded particular subsequent user block is dedicated to the station, calculating, based on the plurality of pilot tone indices for the particular subsequent RU, a carrier phase error estimate.

5. The method for decoding HE-SIGB symbols of claim 1, further comprising:
   receiving, at the station, high efficiency data (HE-DATA) symbols after receiving the HE-SIGB symbol; and
   decoding, based on the stored plurality of RU parameters, HE-DATA symbols.

6. The method for decoding HE-SIGB symbols of claim 1, wherein determining that the particular subsequent user block is dedicated to the station comprises matching a station ID of the station to a station ID encoded in the HE-SIGB symbol.

7. The method for decoding HE-SIGB symbols of claim 1, wherein the plurality of RU parameters encoded in the particular subsequent user block is at least one of the station ID of the station, a number of streams available for transmission to the station, a modulation coding scheme, or forward error correction type.

8. The method for decoding HE-SIGB symbols of claim 1, wherein the counter is an RU tone index counter, further comprising:
   in response to determining that the decoded first user block is not dedicated to the station, incrementing an RU index counter; and
   in response to determining that the decoded particular subsequent user block is dedicated to the station, storing the value of the RU index counter as an intended user index.

9. A system for decoding high efficiency SIGB (HE-SIGB) symbols for downlink orthogonal frequency division multiple access (DL-OFDMA) and downlink multi-user multiple input multiple output (DL-MUMIMO) communications transmitted concurrently to one or more resource units (RU), the system comprising:
   control circuitry, coupled to a station, the control circuitry configured to:
   determine, from an RU size-mapping table comprising a mapping of sequences of RU sizes, a size of a first RU and sizes of respective subsequent RUs, wherein the RU sizes correspond to an amount of tones allocated to the respective RU;
   initialize a counter;
   decode a first user block in a plurality of user blocks in an HE-SIGB symbol;
   in response to determining that the decoded first user block is not dedicated to the station, increase the counter by the size of the first RU;
   continuing to decode subsequent user blocks of the plurality of user blocks in the HE-SIGB symbol and, for each respective subsequent user block determined not to be dedicated to the station, increase the counter by the size of the respective subsequent RU, until determining that a particular subsequent user block is dedicated to the station; and
   in response to determining that the particular subsequent user block is dedicated to the station:
   determine, based on a value of the counter and the size of the particular subsequent RU, a plurality of tones allocated to the station; and
   store the value of the counter and a plurality of RU parameters encoded in the particular subsequent user block; and
   the station configured to receive the HE-SIGB symbol comprising the plurality of user blocks.

10. The system for decoding HE-SIGB symbols of claim 9, wherein the control circuitry is further configured to, in response to determining that the first user block is not dedicated to the station, not store a plurality of RU parameters encoded in the first user block.

11. The system for decoding HE-SIGB symbols of claim 9, wherein the control circuitry is further configured to:
    determine an RU signaling sequence; and
    map the RU signaling sequence to a sequence of RU sizes in the RU size-mapping table.

12. The system for decoding HE-SIGB symbols of claim 9, wherein the control circuitry is further configured to:
    determine, from the RU size-mapping table, a plurality of pilot tone indices for the first RU based on a channel bandwidth of the first RU;
    in response to determining that the decoded first user block is not dedicated to the station, determining, from the RU size-mapping table, a plurality of pilot tone indices for the subsequent RUs based on a channel bandwidth of the subsequent RUs; and
    in response to determining that a decoded particular subsequent user block is dedicated to the station, calculating, based on the plurality of pilot tone indices for the particular subsequent RU, a carrier phase error estimate.

13. The system for decoding HE-SIGB symbols of claim 9, wherein the station is further configured to receive high efficiency data (HE-DATA) symbols after receiving the HE-SIGB symbol and the control circuitry is further configured to decode, based on the stored plurality of RU parameters, HE-DATA symbols.

14. The system for decoding HE-SIGB symbols of claim 9, the control circuitry configured to determine that the particular subsequent user block is dedicated to the station by matching a station ID of the station to a station ID encoded in the HE-SIGB symbol.

15. The system for decoding HE-SIGB symbols of claim 9, wherein the plurality of RU parameters encoded in the particular subsequent block is at least one of the station ID of the station, a number of streams available for transmission to the station, a modulation coding scheme, or forward error correction type.

16. The system for decoding HE-SIGB symbols of claim 9, wherein the counter is an RU tone index counter, and wherein the control circuitry is further configured to:
    in response to determining that the decoded first user block is not dedicated to the station, increment an RU index counter; and
    in response to determining that the decoded particular subsequent user block is dedicated to the station, store the value of the RU index counter as an intended user index.

* * * * *